United States Patent [19]

Reed

[11] Patent Number: 4,909,757

[45] Date of Patent: Mar. 20, 1990

[54] MODULAR JACK PATCH BLOCK

[75] Inventor: Brian E. Reed, New Hartford, Conn.

[73] Assignee: The Siemon Company, Watertown, Conn.

[21] Appl. No.: 291,130

[22] Filed: Jan. 27, 1989

[51] Int. Cl.4 ............................................. H01R 13/74
[52] U.S. Cl. .................................... 439/532; 439/553; 379/399
[58] Field of Search ............... 439/571, 573, 638, 639, 439/554–557, 540, 567, 552, 716, 532; 379/22, 26, 27, 29, 399, 327, 428, 429; 361/426, 428

[56] References Cited

U.S. PATENT DOCUMENTS

| | | | |
|---|---|---|---|
| Re. 31,714 | 10/1984 | Knickerbocker | 439/571 |
| 3,957,335 | 5/1976 | Troy | 439/571 |
| 4,046,449 | 9/1977 | Ranzanigo | 439/553 |
| 4,103,985 | 8/1978 | Krolak et al. | 439/638 |
| 4,392,701 | 7/1983 | Weidler | 439/638 |
| 4,408,819 | 10/1983 | Guelden | 439/638 |
| 4,463,699 | 8/1984 | Knickerbocker | 439/451 |
| 4,585,290 | 4/1986 | Knickerbocker et al. | 439/395 |
| 4,651,340 | 3/1987 | Marson | 439/716 |
| 4,655,521 | 4/1987 | Thomas | 439/460 |
| 4,684,198 | 8/1987 | Becraft et al. | 439/638 |
| 4,702,540 | 10/1987 | Siemon | 439/471 |
| 4,796,289 | 1/1989 | Masor | 379/399 |

Primary Examiner—Gary F. Paumen
Attorney, Agent, or Firm—Fishman, Dionne & Cantor

[57] ABSTRACT

A patch block and bracket assembly is presented. The patch block includes a front face which houses a plurality of modular jacks. Each modular jack is prewired to one or more telephonic elecetrical connectors mounted on the base of the unit. The unitary electrical connector can be interfaced with a mating connector from a satellite piece of equipment. An advantage of this invention is the easy access to a modular jack hook up from several pieces of satellite equipment. The patch block is also used as a modular jack patching device which allows for the administration of wiring moves and changes without special personnel training or technical expertise.

37 Claims, 3 Drawing Sheets

MODULAR JACK PATCH BLOCK

BACKGROUND OF THE INVENTION

This invention relates generally to the field of terminal block and bracket assemblies for use in the telephonic and related data transmission fields. More particularly, this invention relates to a block and bracket assembly which includes a plurality of modular jacks on the exposed front face of the block. Each modular jack is prewired to one or more telephonic electrical connector mounted on the bracket. Satellite equipment may be connected to the modular patch block through the telephonic electrical connectors wired to the jacks thus allowing for efficient use of space and ease of connection.

Presently, there are numerous patching devices which are designed to mount onto rotary racks or backboards. These patching systems have inherently expensive metal construction. Moreover, these patching systems often require specially trained personnel to install and effect changes in the system.

In addition to the need for patching devices, there is also a need to effect electrical communication between modular jacks and terminals on a terminal block of the type disclosed in U.S. Pat. Re. No. 31,714 assigned to the assignee hereof, all of the contents of which are incorporated herein by reference. While techniques and devices are known for mounting modular jacks to terminal blocks, these techniques have been awkward, not user accessible, difficult to wire to satellite equipment, and often only semi-permanent (see for example, U.S. Pat. Nos. 4,585,290 and 4,655,521).

SUMMARY OF THE INVENTION

The above-discussed and other problems of the prior art are overcome or alleviated by the modular jack patch block and bracket assembly of the present invention. In accordance with the present invention, the patch block is comprised of a faceplate which houses a plurality of modular jacks and is preferably attached to a mounting bracket. The modular jacks are prewired to unitary electrical connectors also mounted to the bracket. Each telephonic electrical connector has a color-coded strap to hold its mating connector in place and to identify the modular jacks and/or the satellite equipment to which it is connected.

The modular jacks are held in place on the faceplate by a system of hooks and stops. The hooks and stops are located on both the faceplate of the modular patch block and the modular jack. This hook and stop system allows the modular jacks to be snap-locked into the faceplate for easy assembly.

The faceplate is preferably used in combination with a known bracket for mounting the faceplate on a surface. One embodiment of the bracket comprises two spaced apart elongate side portions and an elongate rear portion coextensive with the side portions. Each of the side portions is secured to opposite edges of the rear portion and is perpendicular thereto. The front portion of the bracket is open.

Mounted to the bracket are the telephonic electrical connectors. Each connector can be used with one or more standard cables (e.g. 25, 32 or 64 pair); each cable being attached to a telephonic electrical connector on the block so that one end of the cable can be simply plugged into any compatible satellite equipment remote from or adjacent to the patch block. This setup alleviates the need for any further wiring.

The bracket may be secured to a wall, backplane or frame for relay back mounting. The faceplate is directed outwardly toward the user where the modular jacks are easily accessed.

The patch block of the present invention provides an improvement to patching systems of the prior art. For example, the patch block of this invention allows for the administration of wiring moves and changes without special personnel training or technical expertise. In addition, the patch block of this invention affords low cost manufacturing and assembly due to its use of certain 66 block compatible hardware and the snap-lock mounting of the modular jacks.

The above discussed and other features and advantages of the present invention will be apparent to and understood to those of ordinary skill in the art from the following detailed description and drawings.

BRIEF DESCRIPTION OF THE FIGURES

Referring now to the drawings, wherein like elements are numbered alike in the several FIGURES.

DESCRIPTION OF THE INVENTION

Figure 3:
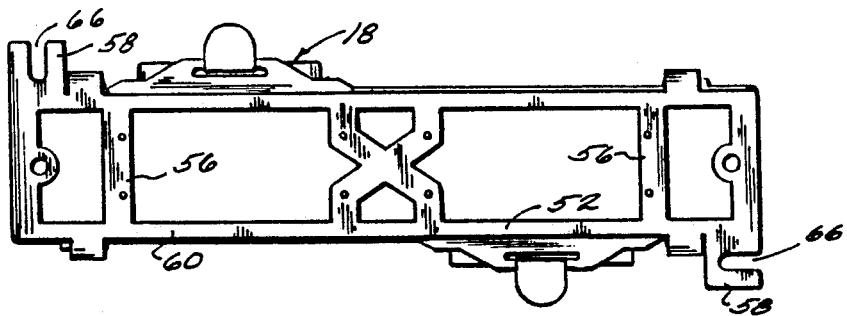
FIG. 3 is a bottom view of the modular patch block of FIG. 1.
Figure 2A:
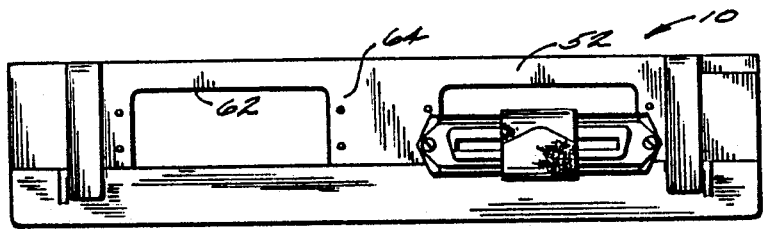
FIG. 2 is a side elevation view of the modular patch block of FIG. 1.
Figures 1, 4:
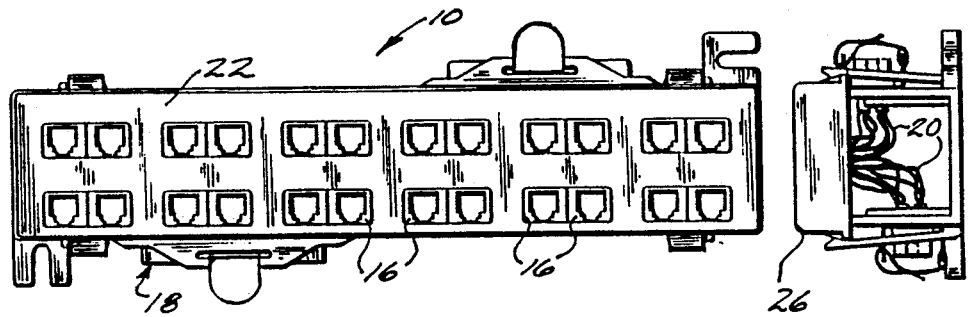
FIG. 1 is a top plan view of the modular patch block and bracket in accordance with the present invention.
FIG. 4 is an end view of the modular patch block of FIG. 1.
Figure 2:
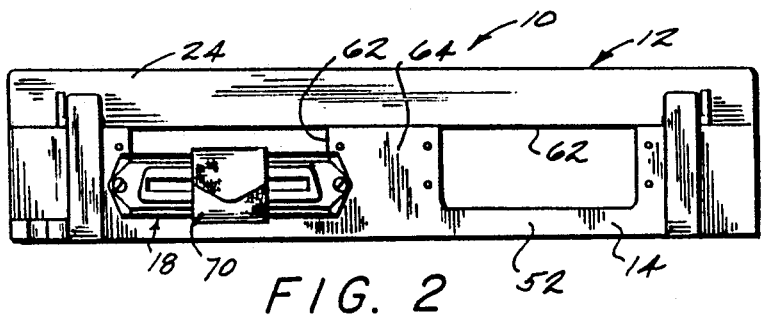

Referring first to FIGS. 1-7, a block and bracket in accordance with the present invention is shown generally at 10. Block and bracket 10 is comprised of a block 12 mounted to a mounting bracket 14. Block 12 includes a faceplate which houses a plurality of modular jacks 16; and bracket 14 houses at least one (in this case two) telephonic electrical connectors 18. Modular jacks 16 are electrically connected to telephonic electrical connectors 18 by conductive wire or leads 20. Modular jacks 16 are well known and used in a variety of communications related applications including telephonic applications.

Block 12 has a rectangular front face or faceplate 22, a pair of opposed sidewalls 24, and a pair of opposed endwalls 26 which together form a rectangular box with an open bottom. Face 22 has a plurality of spaced rectangular openings 28. Each opening 28 is dimensioned to hold one or more (in this case two) modular jacks 16. Openings 28 are formed in an array of two parallel columns of six openings. Each opening 28 includes a pair of opposed interior walls 29a and 29b.

Along the walls 29a and 29b which define the length of opening 28 are modular jack attachment means. The attachment means hold modular jack 16 to modular jack block 12. The attachment means are comprised of a plurality of spaced hooks 30 and stops 32. The attachment means required to hold a single modular jack 16 onto block 12 will now be described. On wall 29a are two spaced stops 32a and one hook 30a. Stops 32a have one face flush with the front face 22 of block 12. Stops 32a extend perpendicularly to and downwardly from front face 22. Hook 30a is centrally located between stops 32a and depends Perpendicularly from the backside of front face 22. A gap is defined by the space between the hook 30a and stops 32a. Hook 30a is L-shaped and includes a resilient body 34a and a head 36a. Head 36a has a triangular or ramped profile defining a hook face.

Sidewall 29b includes a hook 30b. Hook 30b is a single piece and also has a L-shape. Hook 30b is spaced from front face 22 and is in facing relation with hook 30a. A lip 40 is flush with face 22 and runs along wall 29b. Lip 40 extends from wall 29b of opening 28 and is interrupted by gap 42 formed over hook 30b.

It will be appreciated that wall 29b defines the boundary between a second opening 28'. The second opening 28' will have a hook and stop mounting system which is functionally identical to that described in opening 28. In second opening 28', hook 30a' and hook 30b share a common body 34. Note that hook 30b differs from adjacent hook 30a' in that hook 30b terminates as a rectangular block while hook 30a' has a triangular profile similar to hook 30a.

Figure 6:
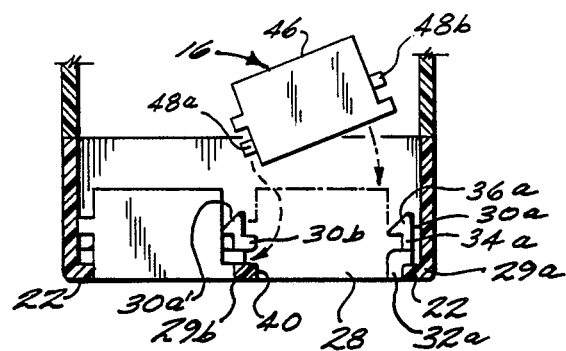
FIG. 6 is a cross-sectional elevation view along the line 6—6 of FIG. 5.
Figure 5:
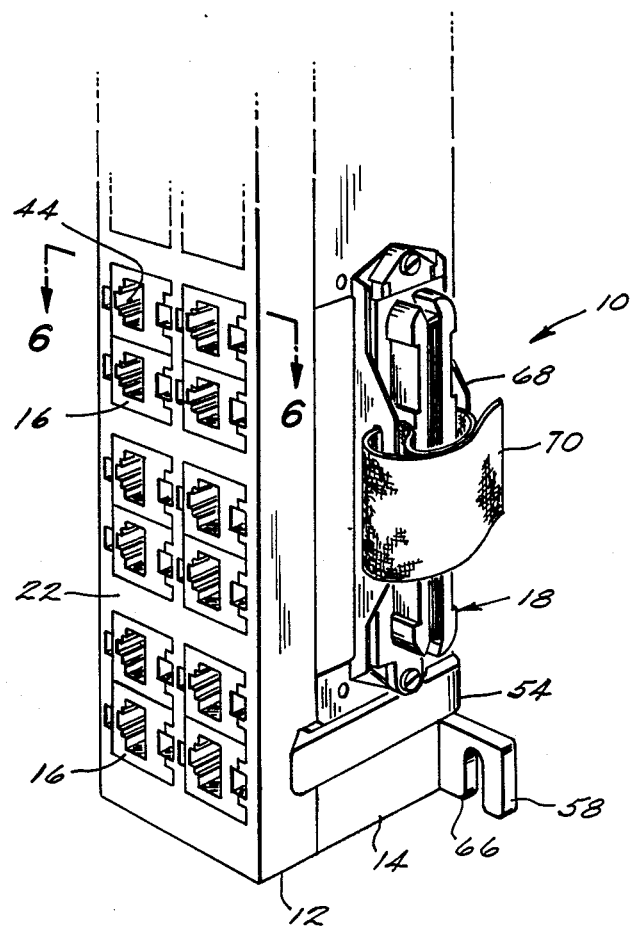
FIG. 5 is an enlarged front perspective view of the modular patch block of FIG. 1.
Figure 7:
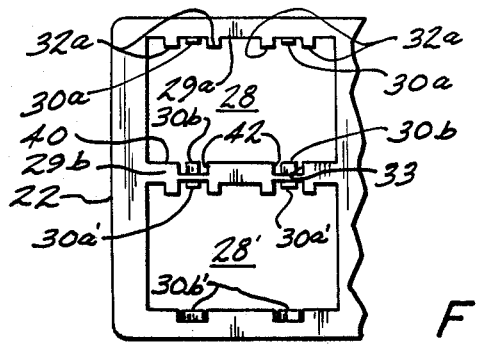
FIG. 7 is an enlarged plan view of a portion of the block of FIG. 1 without the modular jacks in place.

Modular jacks 16 have a known construction including modular jack port 44, an exterior casing 46, and electrical contact means (not shown). Exterior casing 46 has a substantially rectangular box shape. Stops 48a and 48b are located on the ends of casing 46 and are positioned to mate with the hook and stop assemblies adjacent to front face 22 as shown in FIG. 6. Modular jack 16 may be a 2, 4, 6 or 8 position jack (or other connectors or housings with similar mounting means) and nevertheless still be mounted to front face 22. Conductive wires 20 electrically connect modular jacks 16 with telephonic electrical connectors 18 on bracket 14.

Mounting bracket lips 50 are found on the exterior face of side walls 24. Lips 50 are located near the corners of face 22. Lips 50 are L-shaped to prevent both vertical and horizontal movement when mounted to bracket 14.

The mounting bracket 14 and telephonic electrical connectors 18 are substantially similar to those shown in U.S. Pat. Re. No. 31,714. Telephonic electrical connectors 18 are of the male or female type. The connectors are elongate and have a plurality of single electrical connections or contact points within the body of the electrical connector 18. The contact points are arranged in a predetermined array and are each electrically isolated from one another. Each contact points mates with the conductive wire which joins electric connector 18 and modular jack 16. One or more connectors 18 may be attached to mounting bracket 14.

Mounting bracket 14 has parallel elongate sides 52, hooks 54, cross support members 56 and mounting means 58. Cross support members 56 define the block base 60 and interconnect sides 52 to lend stability to bracket 14. Hooks 54 perpendicularly extend from base 60 and are parallel to the width dimension of side 52; extending outwardly of side 52. A plurality of U-shaped open ended slots 62 are included on sides 52. Slots 62 have a support wall 64 centrally located on side 52 which defines one side of each slot 62. Slots 62 are dimensioned to receive unitary electrical connectors 18.

Mounting means 58 extend from the plane of base 60 perpendicular to sides 52. Mounting means can be located on oppositely opposing corners. Mounting means 58 have a slot 66 which is dimensioned to allow the body, but not the head of a fastener to be inserted. Fastener in conjuction with mounting means 58 holds patch block to the wall or frame.

As shown in FIGS. 6, modular jacks 16 are mounted to faceplate 12 by aligning modular jack stops 48 between faceplate hooks 30 and stops 32. Modular jack 16 enters opening 28 from underneath face 22. Stop 48a is aligned between lips 40a and hook 30b. Upon alignment, the jack 16 is rotated into place whereupon stop 48b passes along ramped surface 36a of hook 30a whereupon hook 30a bends slightly outwardly and then snaps back such that stop 48b is entrapped between hook 30a and stops 32a. This procedure is identical for each modular jack mounted on the faceplate.

After all the modular jacks are in place, the patch block 12 and telephonic electrical connectors 18 may be mounted to bracket 14. Patch block faceplate 12 is aligned with bracket 14 so the ends of patch block 12 are flush with the ends of bracket 14, and patch block side walls 24 mate with bracket sides 52. In this configuration, lips 50 align with hooks 54. As patch block is lowered onto bracket 16, lips 50 slide over hook 54, when side walls 24 mate with sides 52, hooks 54 catch lips 50 and hold faceplate 12 to bracket 14.

The unitary electrical connector 18 is joined to connector hold down frame 68 and mounted onto bracket 14. The mounting holes on connector 18 and frame 68 align with mounting holes on bracket 14. Connector 18 and frame 68 are positioned into slot 62. When in slot 62 all mounting holes are aligned and a mechanical fastener is inserted. The fasteners hold frame 68 and connector 18 to bracket 14. Attached to frame 68 is color-coded strap 70. Strap 70 loops outward beyond connector 18. Strap 70 holds satellite equipment connector to patch block connector 18. Strap 70 also identifies satellite equipment or modular jacks to which connector 18 is joined by color coding. Unitary connector 18 and associated strap assembly is known and disclosed in more detail in U.S. Pat. Nos. 4,463,999 and 4,702,540, which are owned by the assignee hereof.

When patch block faceplate 12 and connector 18 are mounted to bracket 14, conductive wire 20 becomes centrally located between bracket sides 52 and under patch block 12. This arrangement creates a neat package which can be easily stored, shipped, handled and inventoried. To provide optimal transmission performance, conductive wires 20 are preferably twisted in groups of two which correspond to the tip and ring conductors of each line pair.

Modular patch block and bracket 10 offers the manufacturer, and installers many benefits and features. For example the patch block can be easily assembled since all parts, except the telephonic connector, may be snapped into place. Once assembled, the patch block and bracket has a rectangular shape thus permitting easy storage, shipping, and installation. The same patch block can incorporate modular jacks with 2, 4, 6, or 8 wires or other devices with similar mounting leading to flexibility in design and application.

Figure 8:
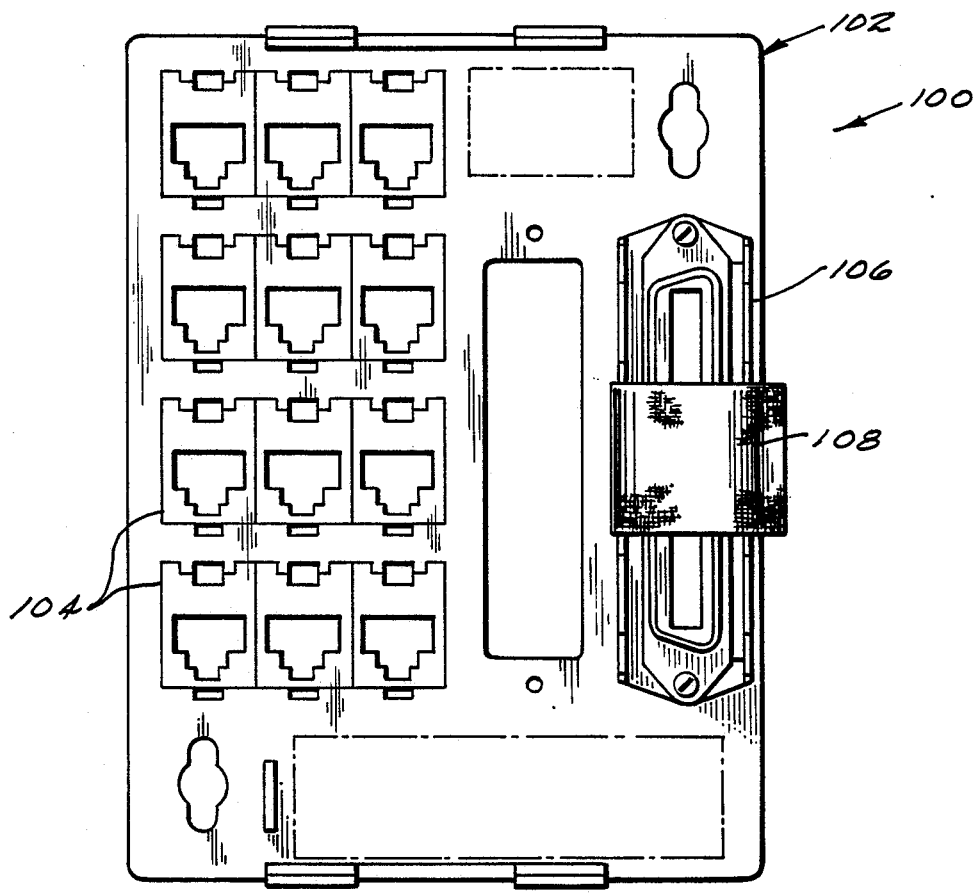
FIG. 8 is a front elevation view of an alternate embodiment of a modular patch block and bracket in accordance with the present invention.

An alternative embodiment to that of FIGS. 1-7 is shown in FIG. 8. FIG. 8 discloses a patch block 100 with a faceplate geometry which is similar to the well known Western Electric 66E type block. As in the embodiment of FIGS. 1-7, block 100 includes a patch block 102, a cover (not shown), modular jacks 104 and electrical connectors 106. Modular jacks 104 are snapped into place onto the face of the modular patch block using the identical attachment means shown in FIGS. 6 and 7. Similarly, modular jacks 104 are electrically connected to unitary electrical connectors 106 in the same fashion. Electrical connectors 106 have straps 108 to hold mating connectors in place and identify satellite equipment. This embodiment offers the benefits of the embodiment of FIGS. 1–7 in a 66E type block.

While preferred embodiments have been shown and described, various modifications and substitutions may be made thereto without departing from the spirit and scope of the invention. Accordingly, it will be understood that the present invention has been described by way of illustration and not limitation.

What is claimed is:

1. A patching block comprising:
   a block, said block including a faceplate with inner and outer sides and a pair of opposed depending side portions;
   at least one rectangular opening in said faceplate, said opening being sized to receive at least one modular telecommunications jack, said opening having opposed first and second sides;
   a first stop extending from the inner side of the faceplate at the first side into the opening;
   a resilient cantilevered first hook extending from the inner side of the faceplate at the first side and spaced farther from the inner side than the first stop, said first stop and first hook cooperating with said jack to effect locking of said jack within said opening;
   at least one modular telecommunications jack attached in one of said openings;
   at least one telephonic connector associated with said block, said telephonic connector comprising a housing having a plurality of electrically isolated contact points arranged in a predetermined array;
   conductive means electrically connecting said at least one modular telecommunications jack to said at least one telephonic connector; and
   stand-off bracket means detachably connected to said block, said telephonic connector being attached to said stand-off bracket means.

2. The block of claim 1 including:
   at least two elongated adjacent rows of said openings.

3. The block of claim 1 including:
   means for snap-locking said stand-off bracket means to said side portions of said block.

4. The block of claim 3 wherein said snap-locking means comprises:
   resilient hook means extending outwardly of said bracket means; and
   extension means on said side portions of said block for receiving and retaining said hook means.

5. The block of claim 1 wherein said bracket means includes:
   an elongated rear portion having end panels and divider means between the end panels to define a plurality of openings in the rear portion to receive said telephonic connector;
   first and second spaced apart elongated side portions extending from said rear portion and being generally perpendicular thereto;
   each of said side portions having a plurality of recesses to receive said telephonic connector;
   fastening means on said bracket for mounting at least one of said telephonic connectors to said bracket means;
   said side portion terminating at an open front portion of the bracket and defining mounting surfaces for receiving said block; and
   mounting means for mounting said bracket means on a support.

6. The block of claim 5 including:
   end portions on said bracket at opposite ends thereof, the end portions being at least partly open to permit passage of wires between said portions.

7. The block of claim 5 wherein:
   said openings in said rear portion and said openings in said side portions are generally rectangular in shape.

8. The block of claim 5 wherein:
   said openings in said rear portion are generally rectangular openings; and
   said side portions include divider panels, and said recesses in said side portions are generally rectangular.

9. The block of claim 8 wherein:
   said end panels and divider panels of said rear portion define pairs of adjacent openings at longitudinally spaced apart stations along said rear portion.

10. A patching block comprising:
    a block, said block including a faceplate with inner and outer sides and a pair of opposed depending side portions;
    at least one opening in said faceplate, said opening being sized to receive at least one modular telecommunications jack, said opening including opposed first and second longitudinal sides;
    modular telecommunications jack attachment means in said opening for retaining a modular telecommunications jack in snap-locked engagement;
    at least one modular telecommunications jack attached in one of said openings;
    at least one telephonic connector associated with said block;
    conductive means electrically connecting said at least one modular jack telecommunications to said to at least one telephonic connector; and
    wherein said modular telecommunications jack attachment means comprises;
    a pair of spaced first stops extending from said inner side of the faceplate at the first longitudinal side;
    a resilient first hook also extending from said inner side of the faceplate at the first longitudinal side, said hook being located between said pair of first stops and being spaced farther from the inner side than said first stops;
    lip means extending from said second longitudinal side and being in facing relation to said pair of first stops; and
    a second hook also extending from said second longitudinal side and being in facing relation to said hook, said second hook being spaced farther from the inner side than said lip means.

11. The block of claim 10 including:
    stand-off block means attached to said block; and
    said telephonic connector being attached to said stand-off bracket means.

12. The block of claim 10 wherein said opening is rectangular.

13. The block of claim 10 wherein:

said first stop and said lip means coterminate with said faceplate of said block.

14. The block of claim 10 including:
a gap formed in said lip means across from said second hook.

15. The block of claim 10 wherein said first hook comprises:
a resilient body; and
a ramped head attached to the terminal end of said resilient body.

16. The block of claim 10 wherein said second hook comprises an L-shaped body.

17. The block of claim 10 including:
at least two elongated adjacent rows of said openings.

18. The block of claim 11 including:
means for snap-locking said stand-off bracket means to said side portions of said block.

19. The block of claim 18 wherein said snap-locking means comprises:
resilient hook means extending outwardly of said bracket means; and
extension means on said side portions of said block for receiving and retaining said hook means.

20. The block of claim 10 wherein:
said at least one telephonic connector is positioned on said faceplate.

21. The block of claim 11 wherein said bracket means includes:
an elongated rear portion having end panels and divider means between the end panels to define a plurality of openings in the rear portion to receive said telephonic connector;
first and second spaced apart elongated side portions extending from said rear portion and being generally perpendicular thereto;
each of said side portions having a plurality of recesses to receive said telephonic connectors;
fastening means on said bracket for mounting at least one of said telephonic connectors to said bracket means;
said side portion terminating at an open front portion of the bracket and defining mounting surfaces for receiving said block; and
mounting means for mounting said bracket means on a support.

22. The block of claim 21 including:
end portions on said bracket at opposite ends thereof, the end portions being at least partly open to permit passage of wires between said portions.

23. The block of claim 21 wherein:
said openings in said rear portion and said openings in said side portions are generally rectangular in shape.

24. The block of claim 21 wherein:
said openings in said rear portion are generally rectangular openings; and
said side portions includes divider panels, and said recesses in said side portions are generally rectangular.

25. The block of claim 21 wherein:
said end panels and divider panels of said rear portion define pairs of adjacent openings at longitudinally spaced apart stations along said rear portion.

26. A patching block comprising:
a block, said block including a faceplate with inner and outer sides and a pair of opposed depending side portions;
at least one opening in said faceplate, said opening being sized to receive at least one modular telecommunications jack, said opening having opposed first and second sides;
a first stop extending from the inner side of the faceplate at the first side;
a resilient cantilevered first hook extending from the inner side of the faceplate at the first side and spaced farther from the inner side than the first stop, said first stop and first hook cooperating with said jack to effect locking of said jack within said opening;
at least one modular telecommunications jack attached in one of said openings;
at least one telephonic connector being attached to said faceplate of said block, said telephonic connector comprising a housing having a plurality of electrically isolated contact points arranged in a predetermined array; and
conductive means electrically connecting said at least one modular jack to said at least one telephonic connector.

27. A patching block comprising:
a block, said block including a faceplate with inner and outer sides and a pair of opposed depending side portions;
at least one opening in said faceplate, said opening being sized to receive at least one modular telecommunications jack, said opening having opposed first and second sides;
a pair of spaced first stops extending from said inner side of the faceplate at the first side;
a resilient first hook also extending from said inner side of the faceplate at the first side, said hook being located between said pair of first stops and being spaced farther from the inner side than said first stops;
lip means extending from said second side and being in facing relation to said pair of first stops; and
a second hook also extending from said second side and being in facing relation to said hook, said second hook being spaced farther from the inner side than said lip means.
at least one modular telecommunications jack attached in one of said openings;
at least one telephonic connector associated with said block, said telephonic connector comprising a housing having a plurality of electrically isolated contact points arranged in a predetermined array;
conductive means electrically connecting said at least one modular telecommunications jack to said at least one telephonic connector; and
stand-off bracket means detachably connected to said block, said telephonic connector being attached to said stand-off bracket means.

28. The block of claim 27 wherein:
said first stops and said lip means coterminate with said faceplate of said block.

29. The block of claim 27 including:
a gap formed in said lip means across from said second hook.

30. The block of claim 27 wherein said first hook comprises:
a resilient body; and
a ramped head attached to the terminal end of said resilient body.

31. The block of claim 27 wherein said second hook comprises an L-shaped body.

32. A patching block comprising:
- a block, said block including a faceplate with inner and outer sides and a pair of opposed depending side portions;
- at least one opening in said faceplate, said opening being sized to receive at least one modular telecommunications jack;
- said opening having opposed first and second sides;
- a pair of spaced first stops extending from said inner side of the faceplate at the first longitudinal side;
- a resilient first hook also extending from said inner side of the faceplate at the first longitudinal side, said hook being located between said pair of first stops and being spaced farther from the inner side than said first stops;
- lip means extending from said second longitudinal side and being in facing relation to said pair of first stops; and
- a second hook also extending from said second longitudinal side and being in facing relation to said hook, said second hook being spaced farther from the inner side than said lip means;
- at least one modular telecommunications jack attached in one of said openings;
- at least one telephonic connector being attached to said faceplate of said block, said telephonic connector comprising a housing having a plurality of electrically isolated contact points arranged in a predetermined array;
- conductive means electrically connecting said at least one modular telecommunications jack to said at least one telephonic connector.

33. The block of claim 32 wherein:
- said first stops and said lip means coterminate with said faceplate of said block.

34. The block of claim 32 including:
- a gap formed in said lip means across from said second hook.

35. The block of claim 32 wherein said first hook comprises:
- a resilient body; and
- a ramped head attached to the terminal end of said resilient body.

36. The block of claim 32 wherein said second hook comprises an L-shaped body.

37. The block of claim 32 including:
- at least two elongated adjacent rows of said openings.

* * * * *